June 13, 1939.                H. JUNGHANS                  2,162,309
               MOVABLE DUSTPROOF BUSH FOR WINDING KEYS
                         Filed Feb. 24, 1937

Inventor:
Helmut Junghans
By Young, Emery & Thompson
    Attorneys

Patented June 13, 1939

2,162,309

UNITED STATES PATENT OFFICE 2,162,309

MOVABLE DUSTPROOF BUSH FOR WINDING KEYS

Helmut Junghans, Schramberg-Sulgen, Wurttemberg, Germany

Application February 24, 1937, Serial No. 127,547
In Germany February 25, 1936

1 Claim. (Cl. 16—2)

This invention relates to a movable dustproof bush for winding keys, and has for its object to avoid, or render invisible, scratches on the holding or cover plate resulting upon a displacement of the bush during the assembly.

According to the invention, this object is accomplished by the fact that the bush on the outside bears merely with a part of its surface against the cover plate, the edge of the bush not contacting with the plate, so that upon displacement of the bush any scratches are invisible. The lack of contact between the edge of the bush and the said cover plate may be rendered possible by providing a stepped portion about the outer edge of the bush, or the outer edge may be bent in desired form and made to cover a corresponding annular surface about the bush.

Figure 1:
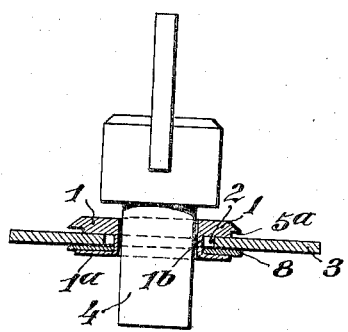
Figure 2:
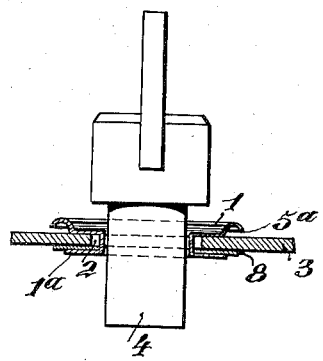
Figure 3:
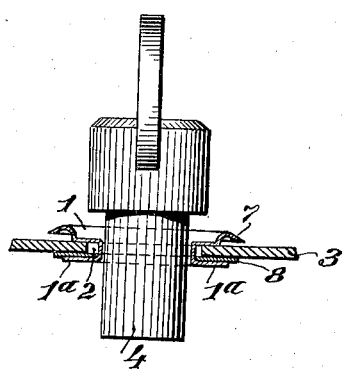

Certain forms of embodiment of the invention are illustrated by way of example in the accompanying drawing in which, Figure 1 is a cross-sectional view of a bush in accordance with the invention, Fig. 2 is a similar view showing a modified construction, and Fig. 3 is a similar view of a further modified construction.

The bush 1 is so arranged in the opening 2 of the holding or cover plate 3 that it bears against the said holding or cover plate on the one side and with its other part 1$^a$ engages about the plate, in which connection it is also desirable to provide an interposed washer 8. If the bush is of massive design, the outer edge of the bush may be formed by a turning operation with a peripheral step, so that upon displacement of the bush 1 in the opening 2 for the purpose of locating the bush concentrically in relation to the key 4 in the opening 1$^b$ any scratches produced on the plate 3 will not be visible, as they will be covered by the free edge 5$^a$ of the bush.

In the modifications of Figs. 2 and 3 there are shown bushings which are composed of a thin material and the outer edges 5$^a$ (Fig. 2) and 7 (Fig. 3) of which are bent upwards in arcuate or in any other desired form so as to cover a comparatively large annular surface about the bush on the outside of the plate.

I claim as my invention:

A movable dustproof bush which is adapted to be rotatably provided in the openings in the cover plates of clocks, particularly for winding keys, setting screws, and the like, comprising two parallel disks each having a central opening which is but slightly larger than the cross sectional area of the key or screw to be inserted through the openings, said disks at the openings being interconnected by a relatively short tubular part to rigidly secure and space the disks from each other to accommodate the thickness of the cover plate, and the one of said disks which is adjacent the outside surface of the cover plate having a peripheral edge flange which is spaced from the cover plate and which extends radially outwardly from the said disk to conceal the part of the outside surface of the cover plate which comes in direct contact with the said disk.

HELMUT JUNGHANS.